(12) United States Patent
Rundell et al.

(10) Patent No.: US 11,496,237 B1
(45) Date of Patent: Nov. 8, 2022

(54) TRANSMISSION CONFIGURATION INDICATION, ERROR DETECTION AND RECOVERY BY TEMPORAL SIGNAL INTERPRETATION

(71) Applicant: Microsoft Technology Licensing, LLC, Redmond, WA (US)

(72) Inventors: Robert Glenn Rundell, Bellevue, WA (US); Julia Jacinta Busono, Woodinville, WA (US); Christopher L. Johnson, Enumclaw, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/345,667

(22) Filed: Jun. 11, 2021

(51) Int. Cl.
*H04L 1/00* (2006.01)
*H04N 21/4425* (2011.01)
*H04L 1/16* (2006.01)
*H04L 1/18* (2006.01)

(52) U.S. Cl.
CPC .......... *H04L 1/0006* (2013.01); *H04L 1/1678* (2013.01); *H04L 1/187* (2013.01); *H04N 21/4425* (2013.01)

(58) Field of Classification Search
None
See application file for complete search history.

(56) References Cited

U.S. PATENT DOCUMENTS

| 6,313,822 B1 | 11/2001 | Mckay et al. |
| 7,327,792 B2 | 2/2008 | Seo |
| 8,547,413 B2 | 10/2013 | Choi |
| (Continued) | | |

FOREIGN PATENT DOCUMENTS

KR      20090106070 A      10/2009

OTHER PUBLICATIONS

"Configuration of Client scaling, DPI scaling, and DPI matching with Citrix Workspace app for Windows", Retrieved from: https://support.citrix.com/article/CTX230017, Nov. 20, 2017, 5 Pages.
(Continued)

*Primary Examiner* — Mujtaba M Chaudry
(74) *Attorney, Agent, or Firm* — Fiala & Weaver P.L.L.C.

(57) ABSTRACT

A transmission configuration and/or configuration errors and recovery may be determined or implemented by temporal interpretation of one or more signals. A transmitter may interpret one or more signals a first way during one or more time windows and a second way during one or more other time windows. Video resolution may be indicated in a V-by-One® interface by temporal interpretation of HPD and/or CDR lock. Transmission format may be indicated before or after transmission begins. Transmitter configuration error detection and recovery may be implemented by temporal interpretation. A transmitter may transmit data in an assumed/default format. A receiver may indicate the assumed transmission format is incompatible with the receiver configuration. A receiver may indicate a compatible transmission format, for example, based on timing or pulsing transitions in a temporally repurposed signal. A transmitter may respond to the repurposed signal indication by transmitting a different (e.g., compatible) format.

20 Claims, 5 Drawing Sheets

(56) References Cited

U.S. PATENT DOCUMENTS

| | | | |
|---|---|---|---|
| 8,780,270 B2 | 7/2014 | Kimoto | |
| 9,614,618 B2 * | 4/2017 | Bowler | H04N 21/4347 |
| 9,723,291 B2 | 8/2017 | Lee et al. | |
| 9,893,912 B1 * | 2/2018 | Wei | H04L 27/2614 |
| 10,841,355 B2 * | 11/2020 | Sengoku | H04L 65/61 |
| 2010/0289949 A1 | 11/2010 | Kobayashi | |
| 2012/0317607 A1 | 12/2012 | Wyatt et al. | |
| 2013/0070063 A1 | 3/2013 | Yang | |
| 2021/0263224 A1 * | 8/2021 | Parekh | G02B 6/4284 |

OTHER PUBLICATIONS

"International Search Report and Written Opinion Issued in PCT Application No. PCT/US22/028654", dated Aug. 16, 2022, 13 Pages.

* cited by examiner

TRANSMISSION CONFIGURATION INDICATION, ERROR DETECTION AND RECOVERY BY TEMPORAL SIGNAL INTERPRETATION

BACKGROUND

Some transmission interfaces are configured for time-consuming handshake procedures (e.g., HDMI, DisplayPort) to determine configurations while others (e.g., V-by-One®) are configured for fixed transmission (e.g., without protocols to determine configuration). Some regulatory requirements may specify start-up times that require a very short time from power on to presentation of output generated from transmitted data (e.g., video display, audible sound).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for transmission configuration indication, error detection and/or recovery (e.g., to be compatible with a receiver configuration) by temporal interpretation of one or more signals. A transmitter may interpret one or more signals a first way during one or more time windows and a second way during one or more other time windows. For example, video resolution may be indicated in a V-by-One® interface by temporally repurposing a hot plug detect (HPD) signal and/or a clock and data recovery (CDR) lock signal. Transmission format may be indicated before or after transmission begins. Transmitter configuration error detection and recovery may be implemented by temporally interpreting (e.g., repurposing) one or more signals. For example, a transmitter may transmit data in an assumed or default format. A receiver may indicate the assumed transmission format is incompatible with the receiver configuration. A receiver may indicate a compatible transmission format (e.g., among more than two formats), for example, based on timing or pulsing transitions in a temporally repurposed signal. A transmitter may respond to the repurposed signal indication by transmitting a different (e.g., compatible) format.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

If the performance of an operation is described herein as being "based on" a factor, it is to be understood that the performance of the operation may be based solely on that factor or may be based on that factor along with one or more additional factors. Thus, as used herein, the term "based on" should be understood to be equivalent to the term "based at least on."

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Methods, systems and computer program products are provided for transmission configuration indication, error detection and/or recovery (e.g., to be compatible with a receiver configuration) by temporal interpretation of one or more signals. A transmitter may interpret one or more signals a first way during one or more time windows and a second way during one or more other time windows. For example, video resolution may be indicated in a V-by-One® interface by temporally interpreting (e.g., repurposing) a hot plug detect (HPD) signal and/or a clock and data recovery (CDR) lock signal. Transmission format may be indicated before or after transmission begins. Transmitter configuration error detection and recovery may be implemented by temporally interpreting one or more (e.g., temporally repurposed) signals. For example, a transmitter may transmit data in an assumed or default format. A receiver may indicate the assumed transmission format is incompatible with the receiver configuration. A receiver may indicate a compatible transmission format (e.g., among more than two formats), for example, based on timing or pulsing transitions in a temporally interpreted signal. A transmitter may respond to the repurposed signal indication by transmitting a different (e.g., compatible) format.

Some transmission interfaces may be configured with time-consuming handshake procedures (e.g., high-definition multimedia interface (HDMI), DisplayPort (DP), digital visual interface (DVI)) to determine transmission configurations while others (e.g., V-by-One® (Vx1)) may be configured for fixed transmission (e.g., without protocols to determine transmission configuration). Some regulatory requirements may specify start-up times that require a very short time from power on to presentation of output generated from transmitted data (e.g., video display). Some transmission interface implementations may fall outside respective standards. For example, a Vx1 interface may be implemented with multiple receiver configurations and transmission formats. For example, handshake procedures in some transmission interface implementations of HDMI, DisplayPort, DVI, etc., may be modified to comply with regulatory start-up times. Temporal interpretation of one or more signals may be implemented in various transmission interfaces, for example, to provide functionality and/or meet regulatory requirements.

Figure 1A:
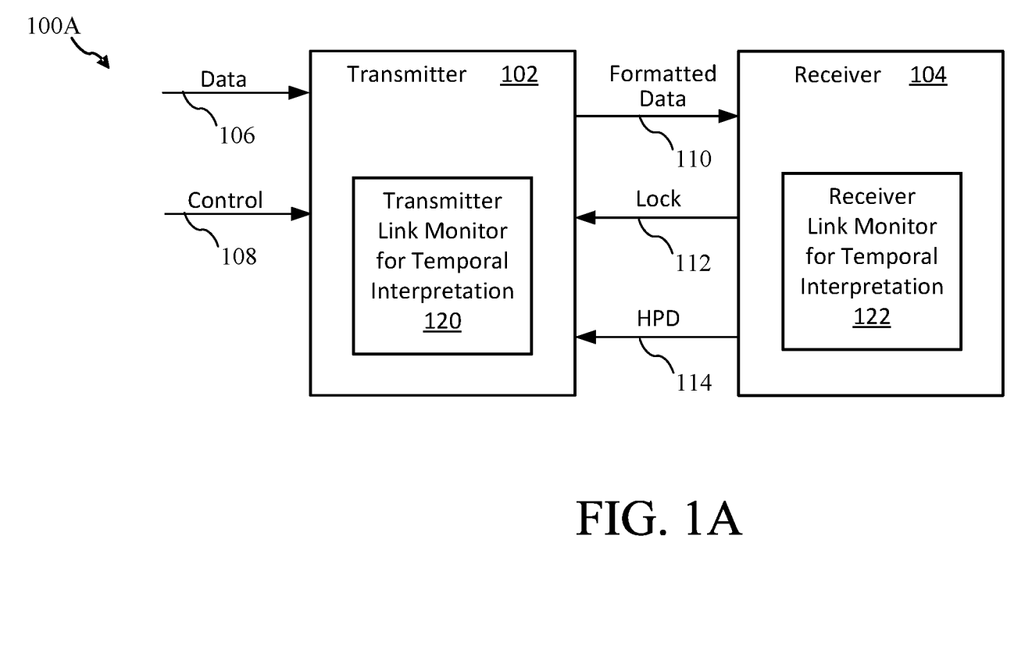
FIG. 1A shows a block diagram of an example system for transmission configuration indication, error detection and/or recovery by temporal control and/or interpretation of one or more signals, according to an example embodiment.

FIG. 1A shows an example system for transmission configuration indication, error detection and/or recovery by temporal control and/or interpretation of one or more signals, according to an example embodiment. Example communication system 100A includes transmitter 102 and receiver 104. Transmitter 102 may receive data 106 from a data source (not shown) and control 108 from a controller (not shown). Data 106 may be any type of data in any format. Control 108 may be any type of control information. Control information may control transmitter 102.

Transmitter 102 may or may not be part of a computing device. As shown in and discussed with respect to FIG. 9, a computing device may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. A computing device is not limited to physical machines, but may include other types of machines or nodes, such as a virtual machine. A computing device may comprise one or more virtual machines, storage devices, servers, operating systems, applications, services, local processes, remote machines, web services, etc. that may be executed, hosted, and/or stored therein.

Transmitter 102 may be configured to transmit information (e.g., data and/or control information) to one or more receivers (e.g., receiver 104). Transmitter 102 and receiver 104 may be configured to communicate using one or more wired and/or wireless communication interfaces. For example, transmitter 102 and receiver 104 may be configured to communicate using an audio interface, a video interface (e.g., HDMI, DP, DVI, Vx1), and/or any other type of wired or wireless communication interface. Transmitter 102 (e.g., based on the communication interface and/or configuration) may or may not be configured to determine a configuration of receiver 104. Some transmitters (e.g., transmitter 102 configured to use an HDMI, DP or DVI interface) may be configured to perform a handshake routine (e.g., a protocol or procedure) to determine a configuration of receiver 104. Some transmitters (e.g., transmitter 102 configured to use a Vx1 interface) may not be configured to perform a handshake routine to determine a configuration of receiver 104. Regardless of the type(s) of communication interface, there may be one or more reasons for transmitter 102 (e.g., and receiver 104) to implement temporal interpretation of one or more signals to provide transmission configuration indication, error detection and/or recovery. Reasons to utilize temporal interpretation of one or more signals to provide transmission configuration indication may include, for example, time constraint(s) (e.g., performance criteria, regulatory start-up times), use of receiver(s) with multiple transmitted data formats, etc.

Transmitter 102 may include, for example, a packer, a scrambler, an encoder, a serializer, and a transmitter link monitor. Various implementations of transmitter 102 may have the same or different components. Transmitter link monitor (for temporal interpretation) 120 may (e.g., constantly) monitor signals from receiver 104, such as lock 112 and HPD 114. Transmitter 102 may execute link training (e.g., clock and data recovery (CDR) training), for example, if lock 112 is not asserted (e.g., high) by receiver 104. Transmitter 102 may send receiver 104 a link training pattern for a link training mode. Transmitter 102 may shift from a training mode to a normal mode, for example, if/when lock 112 is asserted (e.g., to indicate the link, such as CDR, is locked). Transmitter 102 may transmit formatted data 110 to receiver 104 (e.g., based on user logic), for example, in normal mode. Formatted data 110 may be transmitted, for example, over differential pairs between transmitter 102 and receiver 104.

Figure 9:
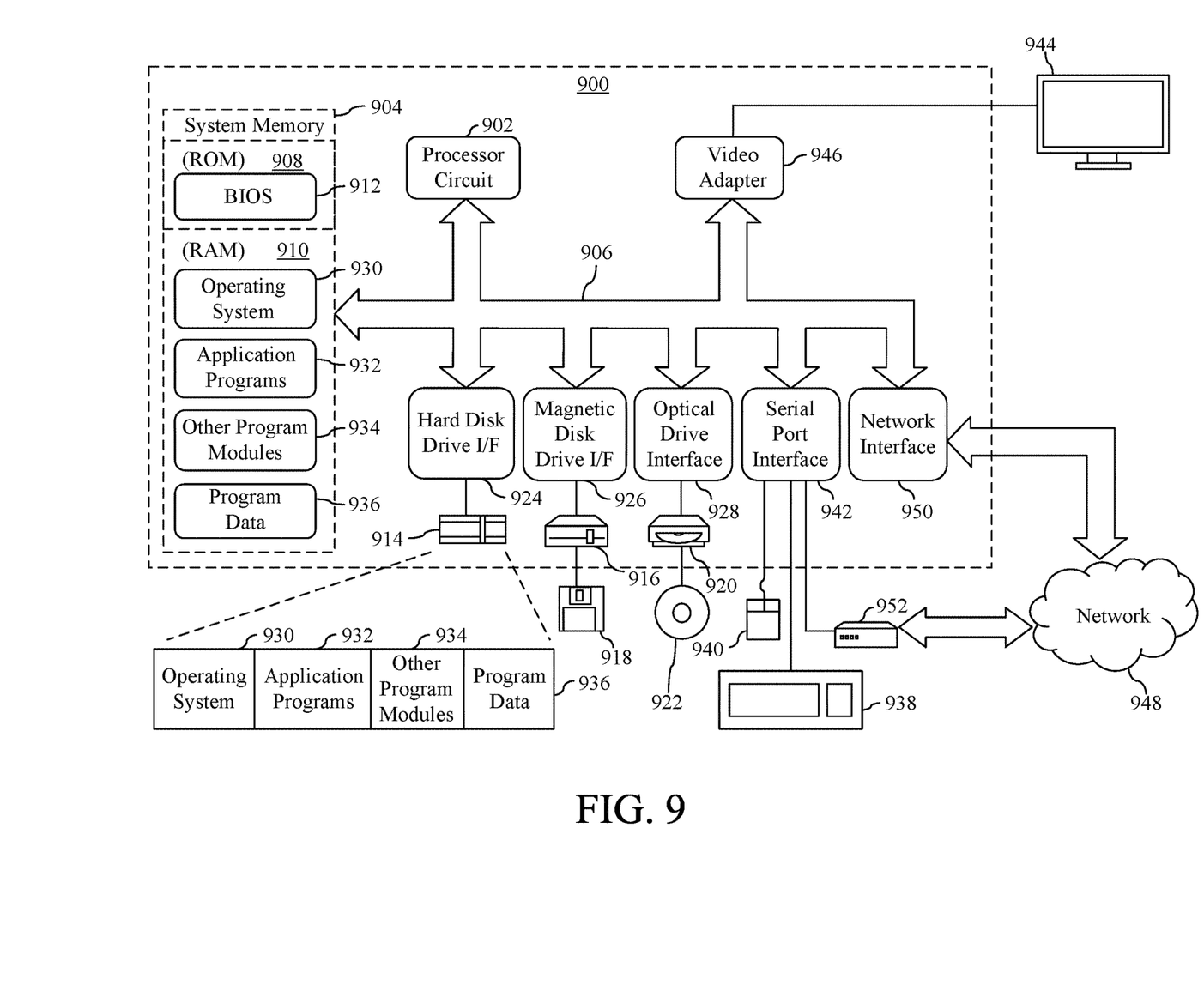
FIG. 9 shows a block diagram of an example computing device that may be used to implement example embodiments.

Receiver 104 may or may not be part of a computing device. As shown in FIG. 9, a computing device may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. A computing device is not limited to physical machines, but may include other types of machines or nodes, such as a virtual machine. A computing device may comprise one or more virtual machines, storage devices, servers, operating systems, applications, services, local processes, remote machines, web services, etc. that may be executed, hosted, and/or stored therein.

Receiver 104 may be configured to receive information (e.g., data and/or control information) from transmitter 102. Transmitter 102 and receiver 104 may be configured to communicate using one or more wired and/or wireless communication interfaces. For example, transmitter 102 and receiver 104 may be configured to communicate using an audio interface, a video interface (e.g., HDMI, DP, DVI, Vx1), and/or any other type of wired or wireless communication interface. Receiver 102 (e.g., based on the communication interface and/or configuration) may or may not be configured to provide a configuration of receiver 104 to transmitter 102 based on a protocol. Some receivers (e.g., receiver 104 configured to use an HDMI, DP or DVI interface) may be configured to perform a handshake routine (e.g., a protocol or procedure) to provide a configuration of receiver 104 to transmitter 102. Some receivers (e.g., receiver 104 configured to use a Vx1 interface) may not be configured to perform a handshake routine to provide a configuration of receiver 104 to transmitter 102. Regardless of the type(s) of communication interface, there may be one or more reasons for receiver 104 (e.g., and transmitter 102) to implement temporal interpretation of one or more signals to provide transmission configuration indication, error detection and/or recovery. Reasons to utilize temporal interpretation of one or more signals to provide transmission configuration indication may include, for example, time constraint(s) (e.g., performance criteria, regulatory start-up times), use of receiver(s) with multiple transmitted data formats, etc.

Receiver 104 may include, for example, an unpacker, a descrambler, a decoder, a serializer, and a receiver link monitor. Various implementations of receiver 104 may have the same or different components. Receiver link monitor (for temporal interpretation) 122 may (e.g., constantly) monitor conditions at receiver 104 used in logic to control one or more signals, such as lock 112 and HPD 114, which transmitter 102 may respond to. Receiver 104 may receive training (e.g., link training), for example, if lock 112 is not asserted (e.g., high) by receiver 104. Receiver 104 may receive from transmitter 102 (e.g., via formatted data 110) a training pattern (e.g., a link training pattern) for a link training mode.

Receiver 104 may synchronize a pixel clock while referring to the link training pattern in link training mode. Receiver 104 may align byte and bit positions, for example, using an alignment (ALN) training pattern. Receiver 104 may receive (e.g., via formatted data 110) data in a normal mode, for example, if/when lock 112 is asserted (e.g., to indicate the link is locked) by receiver 104. Receiver 104 may receive formatted data 110 from transmitter 102 (e.g., based on user logic), for example, in normal mode. Formatted data 110 may be received, for example, over differential pairs between transmitter 102 and receiver 104.

Receiver 104 may be configured (e.g., fixed or configurable) to receive information in one or more audio, video, and/or other data formats. For example, receiver 104 may be configured to receive information from transmitter 102 in a video format (e.g., via formatted data 110) at a particular resolution, refresh rate (e.g., pixel clock), color depth, and/or number of data lanes. Receiver 104 and/or transmitter 102 may be configured (e.g., via transmitter link monitor 120 and/or receiver link monitor 122, respectively) for temporal use and/or interpretation of one or more signals (e.g., lock 112 and/or HPD 114) to indicate a receiver configuration (e.g., an expected data format) before and/or after transmission of formatted data 110 (e.g., in normal mode) and/or for error detection and recovery (e.g., after transmission of formatted data 110, such as based on an incorrectly assumed receiver configuration). In some examples, one or more signals may be temporarily repurposed, used, and/or interpreted (e.g., based on a statically and/or dynamically allocated time window) to (e.g., more quickly) specify a communication configuration or format (e.g., compared to a given protocol) and/or to detect and recover from a configuration or format error.

For example, receiver 104 and transmitter 102 may be configured to communicate via a Vx1 communication interface. Receiver 104 may be a display. There may be multiple receivers with multiple data formats using the same interface. Receiver 104 may be configured to receive data formatted (e.g., via formatted data 110) as cinema full high definition (HD) (e.g., 2560×1080p) resolution at 240 Hz (e.g., 740 MHz pixel clock) with 30 bit color depth over eight (8) data lanes. Transmitter 102 may (e.g., incorrectly) assume receiver is configured to receive formatted data (e.g., formatted data 110) as 4 k×2 k (e.g., 3840×2160p) resolution at 120 Hz (e.g., 1188 MHz pixel clock) with 36 bit color depth over 16 data lanes. Transmitter link monitor 120 and/or receiver link monitor 122 may be configured with one or more temporary windows, before and/or after transmitter transmits formatted data 110 with an incorrect format, to use/indicate and/or to interpret one or more signals (e.g., lock 112 and/or HPD 114) as indications of a configuration (e.g., data format) of receiver 104 and/or as an error in formatted data 110.

For example, transmitter 102 (e.g., transmitter link monitor 120) may be configured to interpret a first signal (e.g., HPD 114) received during a first time window as an indication of whether there is a connection between transmitter 102 and receiver 104. Transmitter 102 may be configured to interpret a second signal (e.g., a lock 112) received during the first time window as an indication of whether there is a link (e.g., CDR) lock by receiver 104. Transmitter 102 may be configured to interpret at least one of the first and second signals (e.g., HPD 114, lock 112) received during a second time window as an indication of transmission format compatibility with receiver 104 (e.g., or as an indication of a configuration of the receiver or as an indication for the transmitter to switch to a different transmission format). Transmitter 102 may be configured to transmit information (e.g., video and/or audio data) to receiver 104 in a selected format based on the indication received during the second time window.

The second time window may be determined, for example, based on a time of assertion of the first or second signals (e.g., HPD 114, lock 112). The second time window may occur after the first time window.

Transmitter 102 may be (e.g., further) configured to transmit the information in an assumed format before the second time window (e.g., without determining the configuration of receiver 104 or a compatible format for receiver 104). Transmission of an assumed format (e.g., based on an assumed configuration of receiver 104) may lead to configuration error detection and recovery.

Transmitter 102 may be configured to transmit information in the selected format based on the indication received during the second time window, for example, by changing transmission format of the information from the assumed format to the selected format based on the indication received during the second time window.

Transmitter 102 may be configured to interpret at least one of the first and second signals received during the second time window as an indication of transmission format compatibility with receiver 104, for example, by interpreting deassertion of the first signal (e.g., HPD 114) or second signal (e.g., lock 112) during the second time window as an indication that the assumed format is incompatible with receiver 104.

Transmitter 102 may be configured to interpret at least one of the first and second signals (e.g., HPD 114 and/or lock 112) received during the second time window as an indication of transmission format compatibility with receiver 104, for example, by interpreting deassertion of the first signal (e.g., HPD 114) or second signal (e.g., lock 112) at a first time after assertion of the second signal (e.g., lock 112) as an indication of a first compatible format; and by interpreting deassertion of the first signal (e.g., HPD 114) or second signal (e.g., lock 112) at a second time after assertion of the second signal (e.g., lock 112) as an indication of a second compatible format.

Transmitter 102 may be configured to interpret at least one of the first signal (e.g., HPD 114) and second signal (e.g., lock 112) received during the second time window as an indication of transmission format compatibility with receiver 104, for example, by interpreting a first pulse train of the first signal (e.g., HPD 114) or second signal (e.g., lock 112) during the second time window as an indication of a first compatible format; and by interpreting a second pulse train of the first signal (e.g., HPD 114) or second signal (e.g., lock 112) during the second time window as an indication of a second compatible format.

For example, receiver 104 may provide a first signal (e.g., HPD 114) during a first time window as an indication of whether there is a connection between transmitter 102 and receiver 104. Receiver 104 may provide a second signal (e.g., lock 112) during the first time window as an indication whether there is a link (e.g., CDR) lock by receiver 104. Receiver 104 may provide at least one of the first signal (e.g., HPD 114) and second signal (e.g., lock 112) during a second time window as an indication of transmission format compatibility with receiver 104 (e.g., as an indication of a configuration of the receiver, a compatible transmission format, or as an indication for transmitter 102 to switch to a different transmission format). Receiver 104 may receive information (e.g., video and/or audio data via formatted data 110) from transmitter 102 in a selected format, for example, based on the indication provided during the second time window.

Receiver 104 may receive the information in an assumed format (e.g., without providing to transmitter 102 the configuration of the receiver or a compatible format for the receiver). Receiver 104 may provide at least one of the first signal (e.g., HPD 114) and second signal (e.g., lock 112) during a second time window as an indication that the assumed format is incompatible with receiver 104.

Receiver 104 may be configured to provide at least one of the first signal (e.g., HPD 114) and second signal (e.g., lock 112) during a second time window as an indication of transmission format compatibility with receiver 104, for example, by deasserting the first signal (e.g., HPD 114) or second signal (e.g., lock 112) during the second time window as an indication that the assumed format is incompatible with receiver 104.

Receiver 104 may be configured to provide at least one of the first signal (e.g., HPD 114) and second signal (e.g., lock 112) during a second time window as an indication of transmission format compatibility with receiver 104, for example, by deasserting the first signal (e.g., HPD 114) or second signal (e.g., lock 112) at a first time after assertion of the second signal (e.g., lock) as an indication of a first compatible format; and deasserting the first signal (e.g., HPD 114) or second signal (e.g., lock 112) at a second time after assertion of the second signal (e.g., lock 112) as an indication of a second compatible format.

Receiver 104 may be configured to provide at least one of the first signal (e.g., HPD 114) and second signal (e.g., lock 112) during a second time window as an indication of transmission format compatibility with receiver 104, for example, by providing a first pulse train of the first signal (e.g., HPD 114) or second signal (e.g., lock 112) during the second time window as an indication of a first compatible format; and providing a second pulse train of the first signal (e.g., HPD 114) or second signal (e.g., lock 112) during the second time window as an indication of a second compatible format.

The information (e.g., transmitted as formatted data 110) may comprise any type of data (e.g., video data and/or audio data). Receiver 104 may include, for example, a display, a speaker, and/or other presentation device. Transmitter 102 and receiver 104 may comprise, for example, a Vx1 transmitter and a Vx1 receiver, or a transmitter and receiver for any other communication interface. The second time window may be determined, for example, based on a time of assertion of the first signal (e.g., HPD 114) or second signal (e.g., lock 112). The second time window may occur after the first time window.

Figure 1B:
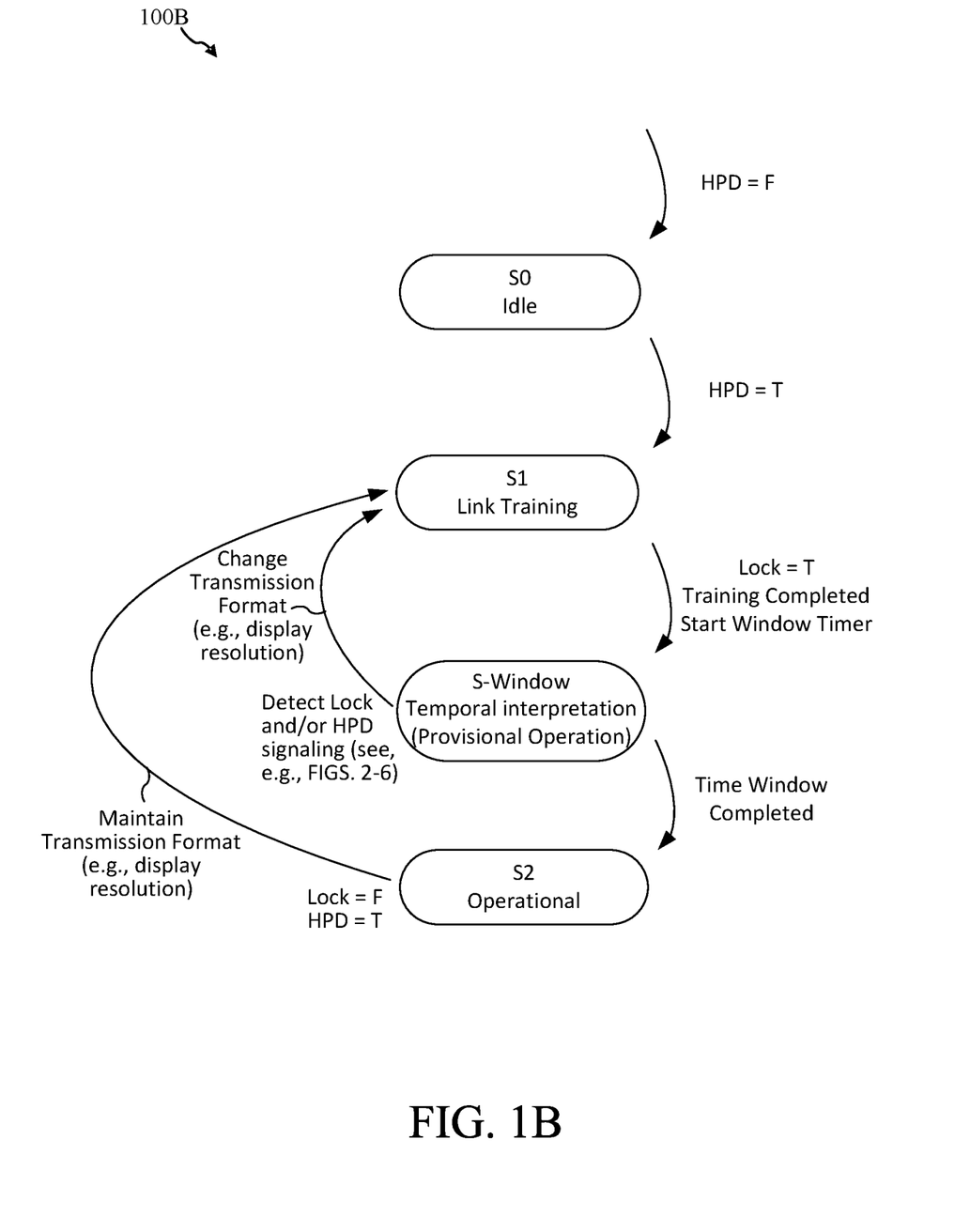
FIG. 1B shows an example of operation of the example system shown in FIG. 1A for transmission configuration indication, error detection and/or recovery by temporal control and/or interpretation of one or more signals, according to an example embodiment.

FIG. 1B shows an example of operation of the example system shown in FIG. 1A for transmission configuration indication, error detection and/or recovery by temporal control and/or interpretation of one or more signals, according to an example embodiment. FIB. 1B shows a generalized example that may be implemented in any specific example, e.g., Vx1, PCIexpress 3.0, USB 3.0, DP, HDMI, DVI, and so on. Terminology may be different in various communication interfaces, but one of ordinary skill would know how to apply the subject matter disclosed herein in communication interfaces. For example, a training phase may be referred to in various communication interfaces as link training, CDR training, physical medium training, and so on. As shown by example in FIG. 1B, operation of transmitter 102 and/or receiver 104 (e.g., transmitter link monitor 120 and/or receiver link monitor 122) may be described and/or implemented as a state machine. FIG. 1B shows an example state diagram for transmitter 102 (e.g., transmitter link monitor 120). Example state diagram 100B shown in FIG. 1B is one of many example implementations of transmission configuration indication, error detection and/or recovery by temporal control and/or interpretation of one or more signals. FIG. 1B shows one temporal interpretation window (e.g., S-window). In various implementations, there may be one or more temporal interpretation windows at one or more times before and/or after data transmission in an unlimited variety of logic implemented as state diagrams or otherwise.

As shown in FIG. 1B, at state zero (S0), transmitter 102 may be in an idle state (e.g., with HPD=F, such as high or 1). Transmitter 102 operation may transition from S0 to S1, for example, if/when transmitter 102 receives an indication that receiver 104 asserted HPD 114 (e.g., HPD=T, such as low or 0).

At S1, transmitter 102 may be in a link (e.g., CDR) training state. In some examples, receiver 104 may have a phase locked loop (PLL) locked for link training. Transmitter 102 operation may transition from S1 to S-Window, for example, if/when transmitter 102 receives an indication that receiver 104 asserted lock 114 (e.g., lock=T, such as low) and/or another indication that training is complete. A timer may be started for the window state (S-window). Transmitter 102 operation may transition to S1 from S-Window and/or S2, for example, if/when transmitter 102 receives an indication that receiver 104 deasserted lock 112 while HPD remains asserted (e.g., lock=F, HPD=T) and/or in response to a temporal interpretation of lock 112 and/or HPD 114 during a window state (S-Window).

At S-Window, transmitter 102 may be in a temporal window state (e.g., a timed wait state) for temporal interpretation of one or more signals (e.g., lock 112 and/or HPS 114) to determine whether receiver 104 provided a transmission configuration indication. The S-Window state may be a provisional operation/running state, where operation may proceed if no problems are indicated/detected. The provisional operation state or temporal window referred to as S-Window may be provided for receiver 104 to determine whether formatted data 110 is compatible with receiver 104 and to provide an indication to transmitter 102. Receiver 104 may deassert (e.g., negate) lock 112 (e.g., lock=F), for example, if receiver 104 cannot decode formatted data 110. S-Window may permit transmitter 102 to distinguish one or more types of errors in formatted data 110 and/or receive a configuration indicated by receiver 104 before an error is detected (e.g., depending on the location(s) of S-Window(s)).

Transmitter 102 may or may not detect a signal during the temporal (e.g., timed) S-window. Transmitter 102 operation may transition from S-Window to S2, for example, if/when the window timer expires (e.g., without transmitter 102 detecting an indication by receiver 104, such as if/when formatted data 110 is correct). Transmitter 102 operation may transition from S-Window to S1, for example, if transmitter 102 detects an indication by receiver 104 (e.g., lock 112 and/or HPD 114 signaling) during the window. Transmitter 102 may respond to the detection by providing the indicated formatted data 110, which may be compatible with receiver, and/or by changing a current transmission format to a new transmission format (e.g., from a current display resolution to a new display resolution).

During the temporal (e.g., timed) S-Window, receiver 104 may signal (e.g., using lock 112 and/or HPD 114) and transmitter 102 may interpret the signal to indicate, for example, a receiver configuration (e.g., a specific compatible transmission format) and/or to indicate that a current transmission format is incompatible (e.g., erroneous). Transmitter 102 may interpret the receiver's temporal signal (e.g., lock 112 and/or HPD 114) to select and transmit formatted data 110 in another (e.g., new or changed) format. Whether the new/changed format is correct may depend, for example, on the number of available formats and/or on the indication provided by receiver 104 and interpreted by transmitter 102. For example, receiver 104 may indicate a specific format before and/or after transmitter transmits formatted data. As another example, if there are two formats, receiver 104 may simply indicate the current format (e.g., assumed format) is erroneous so that transmitter 102 responds by providing the correct format (e.g., compatible format). As a further example, if there are 10 formats and receiver 104 indicates and/or transmitter 102 interprets the receiver's signal that the current format is incorrect, transmitter 102 may select and transmit a format (a selected format) that may or may not be a compatible format.

Temporal interpretation logic may or may not be implemented in receiver link monitor 122. In some examples, receiver link monitor may react 114 to incorrect formatted data 110 by controlling (e.g., signaling) lock 112 and/or HPD and transmitter 102 may interpret the signals). In some examples, temporal signaling and interpretation logic may be implemented in receiver 102 and transmitter 102.

At S2, transmitter 102 may be in an operational (e.g., running) state. For example, transmitter 102 may transmit formatted data 110 (e.g., audio data, video data, and/or other data) to receiver 102 in an assumed format, a selected format, and/or a compatible format. Transmitter 102 operation may transition from S2 to S1, for example, if transmitter 102 detects a deassertion of lock by receiver 104 (e.g., lock=F while HPD=T for lock 112 and/or HPD 114 signaling). Transmitter 102 may respond to the deassertion of lock during operational state S2 by maintaining a current transmission format (e.g., maintaining a current display resolution). Following retraining in state S1, receiver 104 may not signal and transmitter 102 may not detect a transmission format (e.g., resolution) indication during temporal window S-Window state, and may return to operation state S2.

Additional examples of operation of transmitter 102 and receiver 104 are shown in and discussed relative to FIGS. 2-6.

Figure 2:
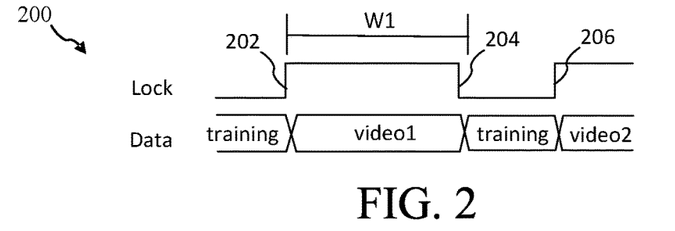
FIG. 2 shows an example of temporal interpretation of a lock signal for transmission configuration indication, error detection and/or recovery, according to an example embodiment.

FIG. 2 shows an example of temporal interpretation of a lock signal for transmission configuration indication, error detection and/or recovery, according to an example embodiment. Timing diagram 200 shows an example of temporal interpretation of lock 112 during time window W1 (e.g., S-window in FIG. 1B). Receiver 104 may assert lock 112 at 202, for example, to indicate completion of training. Transmitter 102 may transition from transmitting training data to transmitting first video data (e.g., video data with a first format) video1 (e.g., as formatted data 110). Receiver 104 may deassert lock 112 at 202, for example, to indicate an inability to decode formatted data 110. Deassertion 204 may occur within time window W1. Transmitter 102 may interpret deassertion of lock during time window W1 as an indication that the format of video1 is erroneous or incompatible with receiver 104. Transmitter may respond to the temporal interpretation of lock 112 by changing the existing format (e.g., video1 format) to a new format (e.g., video2 format) and return to a training state (e.g., S1 link training in FIG. 1B). Transmitter 102 may transmit training data until receiver 104 asserts lock 112 at 206. At 206, transmitter 102 may transmit video2 (e.g., as formatted data 110). In some examples, transmitter 102 (e.g., transmitter link monitor 120) may respond to deassertion of lock 112 at 204 by transmitting video2 at 204 (e.g., without returning to training).

Figure 3:
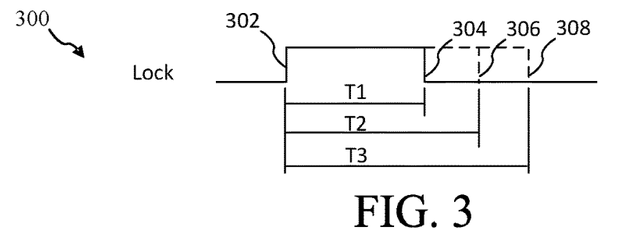
FIG. 3 shows an example of temporal interpretation of a lock signal for transmission configuration indication, error detection and/or recovery, according to an example embodiment.

FIG. 3 shows an example of temporal interpretation of a lock signal for transmission configuration indication, error detection and/or recovery, according to an example embodiment. Timing diagram 300 shows an example of temporal interpretation of lock 112 during a time window (e.g., S-window in FIG. 1B or W1 in FIG. 2). Receiver 104 may assert lock 112 at 302, for example, to indicate completion of training. Transmitter 102 may transition from transmitting training data to transmitting first video data (e.g., video1 as formatted data 110). Receiver 104 may deassert lock 112 at 304, 306 or 308. The time between assertion and deassertion of lock 112 may be deassertion time T1, T2 or T3, respectively, depending on deassertion of lock 112 at 304, 306 or 308. Transmitter 102 may interpret deassertion of lock at 304, 306, or 308 (deassertion times T1, T2, or T3) as indications of one or more different types of configuration errors and/or indications of receiver configuration (e.g., transmission format). For example, deassertion time T1 may indicate transmitter 102 should switch from a first format to a second format, deassertion time T2 may indicate transmitter 102 should switch from a first format to a third format, and deassertion time T3 may indicate transmitter 102 should switch from a first format to a fourth format. Transmitter may respond to the temporal interpretation of lock 112 (e.g., at deassertion time T1, T2, or T3) by changing the existing format (e.g., video1 format) to a new (e.g., selected) format (e.g., the second, third or fourth format).

Figure 4:
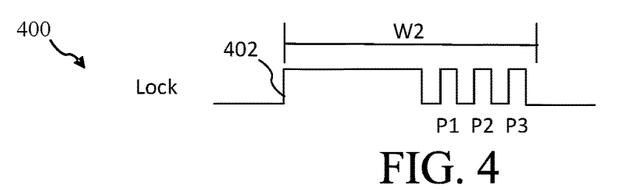
FIG. 4 shows an example of temporal interpretation of a lock signal for transmission configuration indication, error detection and/or recovery, according to an example embodiment.

FIG. 4 shows an example of temporal interpretation of a lock signal for transmission configuration indication, error detection and/or recovery, according to an example embodiment. Timing diagram 400 shows an example of temporal interpretation of lock 112 during a time window W2 (e.g., S-window in FIG. 1B). Receiver 104 may assert lock 112 at 402, for example, to indicate completion of training. Transmitter 102 may transition from transmitting training data to transmitting first video data (e.g., video1 as formatted data 110). Receiver 104 may deassert and reassert lock 112 to create one or more pulses (e.g., pulse one (P1), pulse two (P2), pulse three (P3), and so on) in the temporal interpretation window, for example, to indicate information pertaining to an inability to decode formatted data 110 and/or to indicate a configuration of receiver 102. Transmitter 102 may interpret the number of pulses (e.g., and/or pulse width(s)) as indications of one or more different types of configuration errors and/or indications of receiver configuration (e.g., transmission format). For example, first pulse P1 may indicate transmitter 102 should switch from a first format to a second format, first and second pulse P2 may indicate transmitter 102 should switch from a first format to a third format, and first, second and third pulses P1, P2, P3 may indicate transmitter 102 should switch from a first format to a fourth format. Transmitter may respond to the temporal interpretation of lock 112 (e.g., pulses P1, P2, and/or P3) by changing the existing format (e.g., video1 format) to a new (e.g., selected) format (e.g., the second, third or fourth format).

Figure 5:
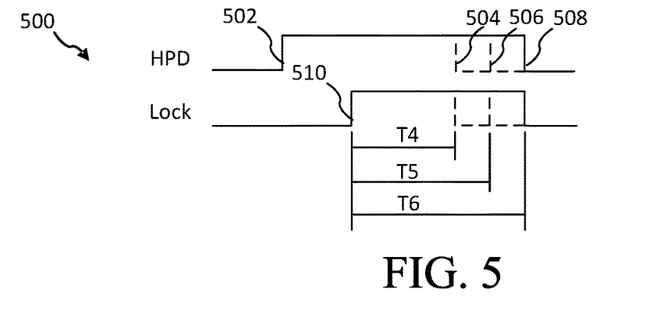
FIG. 5 shows an example of temporal interpretation of a lock signal and an HPD signal for transmission configuration indication, error detection and/or recovery, according to an example embodiment.

FIG. 5 shows an example of temporal interpretation of a lock signal and an HPD signal for transmission configuration indication, error detection and/or recovery, according to an example embodiment. Timing diagram 500 shows an example of temporal interpretation of lock 112 and HPD 114 during a time window (e.g., S-window in FIG. 1B or W1 in FIG. 2). Receiver 104 may assert HPD 114 at 502, for example, to indicate receiver 104 is connected to transmitter 102. Receiver 104 may assert lock 112 at 510, for example, to indicate completion of training. Transmitter 102 may transition from transmitting training data to transmitting first video data (e.g., video1 as formatted data 110). Receiver 104 may deassert lock 112 and/or HPD 114 at 504, 506 or 508. The time between assertion and deassertion of lock 112 and/or HPD 114 may be deassertion time T4, T5 or T6, respectively, depending on deassertion of lock 112 and/or HPD 114 at 504, 506 or 508. Lock 112 and HPD 114 may be deasserted at the same or different times. Transmitter 102 may interpret deassertion of lock 112 and/or HPD 114 at 504, 506, or 508 (deassertion times T4, T5, or T6) as indications of one or more different types of configuration errors and/or indications of receiver configuration (e.g., transmission format). For example, deassertion time T4 may indicate transmitter 102 should switch from a first format to a second format, deassertion time T5 may indicate transmitter 102 should switch from a first format to a third format, and deassertion time T6 may indicate transmitter 102 should switch from a first format to a fourth format. Transmitter may respond to the temporal interpretation of lock 112 and/or HPD 114 (e.g., at deassertion time T4, T5, or T6) by changing the existing format (e.g., video1 format) to a new (e.g., selected) format (e.g., the second, third or fourth format).

Figure 6:
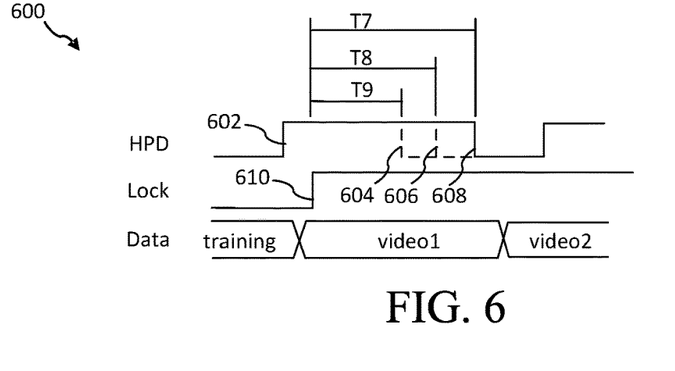
FIG. 6 shows an example of temporal interpretation of an HPD signal for transmission configuration indication, error detection and/or recovery, according to an example embodiment.

FIG. 6 shows an example of temporal interpretation of an HPD signal for transmission configuration indication, error detection and/or recovery, according to an example embodiment. Timing diagram 600 shows an example of temporal interpretation of lock 112 and HPD 114 during a time window (e.g., S-window in FIG. 1B or W1 in FIG. 2). Receiver 104 may assert HPD 114 at 602, for example, to indicate receiver 104 is connected to transmitter 102. Receiver 104 may assert lock 112 at 610, for example, to indicate completion of training. Transmitter 102 may transition from transmitting training data to transmitting first video data (e.g., video1 as formatted data 110). Receiver 104 may deassert HPD 114 at 604, 606 or 608 while asserting lock 122. The time between assertion and deassertion of HPD 114 may be deassertion time T7, T8 or T9, respectively, depending on deassertion of HPD 114 at 504, 506 or 508. Transmitter 102 may interpret deassertion of HPD 114 at 604, 606, or 608 (deassertion times T7, T8, or T9) as indications of one or more different types of configuration errors and/or indications of receiver configuration (e.g., transmission format). For example, deassertion time T7 may indicate transmitter 102 should switch from a first format to a second format, deassertion time T8 may indicate transmitter 102 should switch from a first format to a third format, and deassertion time T9 may indicate transmitter 102 should switch from a first format to a fourth format. Transmitter may respond to the temporal interpretation of HPD 114 (e.g., at deassertion time T7, T8, or T9) by changing the existing format (e.g., video1 format) to a new (e.g., selected) format (e.g., the second, third or fourth format), such as video2 (e.g., as shown by example in FIG. 6).

Implementations are not limited to the examples shown. Example system 100 or components therein, and/or other systems and components in other examples may operate, for example, according to example methods presented in FIGS. 7 and 8.

Figure 7:
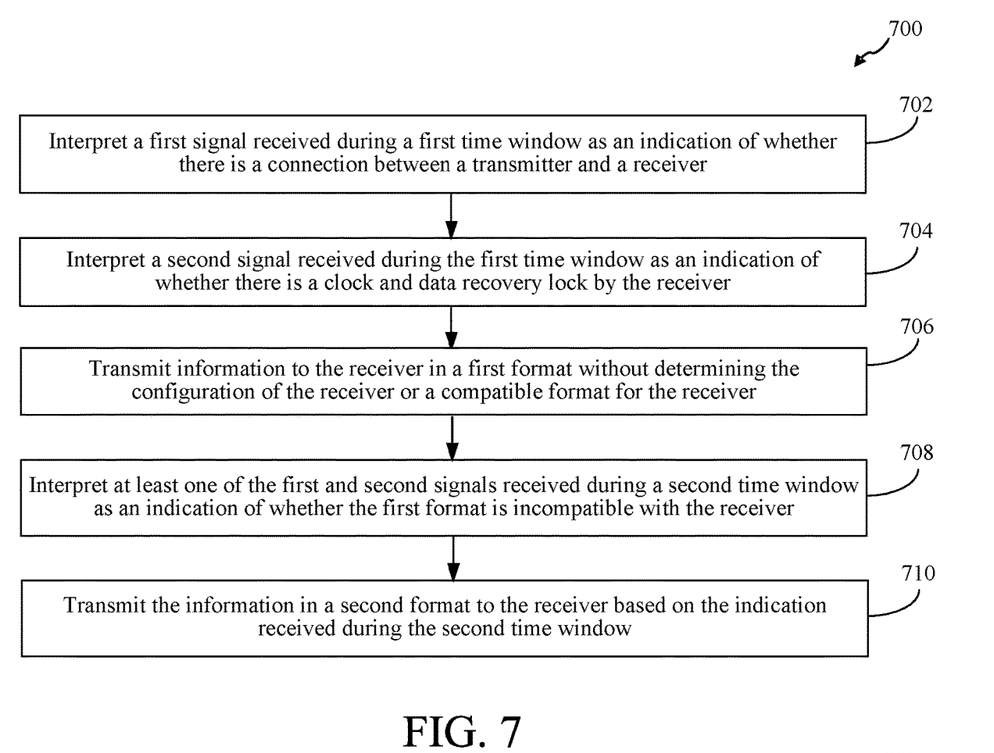
FIG. 7 shows a flowchart of an example method implemented by a transmitter for transmission configuration indication, error detection and/or recovery, according to an example embodiment.

Embodiments may be implemented in processes or methods. For example, FIG. 7 shows a flowchart of an example method for identifying and providing alerts for websites new to the web, according to an example embodiment. Embodiments disclosed herein and other embodiments may operate in accordance with example method 700. Method 700 comprises steps 702-710. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

In step 702, a first signal received during a first time window may be interpreted as an indication of whether there is a connection between a transmitter and a receiver. For example, as shown in FIGS. 1A and 1B, during states S0-S2 (not including state S-window) transmitter 102 may interpret HPD 114 to indicate receiver 104 is connected to transmitter 102.

In step 704, a second signal received during the first time window may be interpreted as an indication of whether there is a clock and data recovery lock by the receiver. For example, as shown in FIGS. 1A and 1B, during states S0-S2 (not including state S-window) transmitter 102 may interpret lock 112 to indicate receiver 104 has CDR lock.

In step 706, information may be transmitted to the receiver in a first format without determining the configuration of the receiver or a compatible format for the receiver, as shown in FIGS. 1A and 1B, transmitter 102 may transmit formatted data 110 in a first format to receiver 104 without receiving an indication or determining a configuration of receiver 104.

In step 708, at least one of the first and second signals received during a second time window may be interpreted as an indication of whether the first format is incompatible with the receiver. For example, as shown in FIGS. 1A and 1B, during state S-window, transmitter 102 may temporally interpret lock 112 and/or HPD 114 (e.g., see signaling examples in FIGS. 2-6) as an indication of whether the first format is incompatible with the receiver.

In step 710, the information may be transmitted in a second format to the receiver based on the indication received during the second time window. For example, as shown in FIGS. 1A and 1B, transmitter 102 may transmit formatted data 110 in a second format to receiver 104 based on the interpretation of signaling of HPD 114 and/or lock 112 during state S-window.

Figure 8:
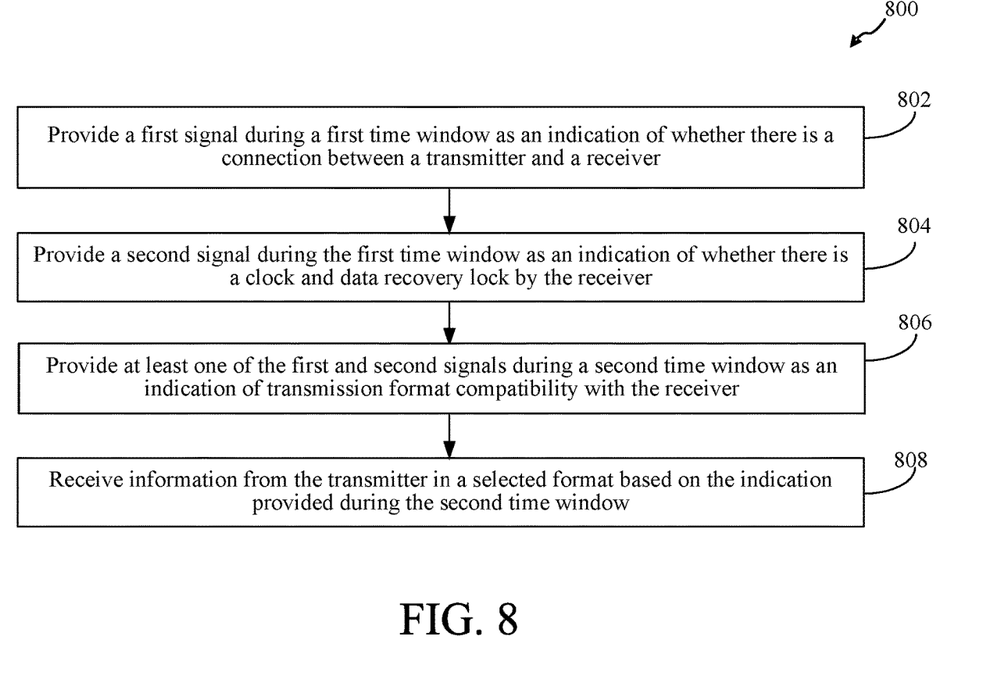
FIG. 8 shows a flowchart of an example method implemented by a receiver for transmission configuration indication, error detection and/or recovery, according to an example embodiment.

FIG. 8 shows a flowchart of an example method for identifying and providing alerts for websites new to the web, according to an example embodiment. Embodiments disclosed herein and other embodiments may operate in accordance with example method 800. Method 800 comprises steps 802-808. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

In step 802, a first signal may be provided during a first time window as an indication of whether there is a connection between a transmitter and a receiver. For example, as shown in FIGS. 1A and 1B, during states S0-S2 (not including state S-window) receiver 104 may provide HPD 114 to indicate receiver 104 is connected to transmitter 102.

In step 804, a second signal may be provided during the first time window as an indication of whether there is a clock and data recovery lock by the receiver. For example, as shown in FIGS. 1A and 1B, during states S0-S2 (not including state S-window) transmitter 102 may interpret lock 112 to indicate receiver 104 has CDR lock.

In step 806, at least one of the first and second signals may be provided during a second time window as an indication of transmission format compatibility with the receiver. For example, as shown in FIGS. 1A and 1B, receiver 104 may provide (e.g., generate) signaling on lock 112 and/or HPD 114 during S-window to indicate a configuration of receiver 104 and/or to indicate a current format is incompatible with receiver 104.

In step 808, information may be received from the transmitter in a selected format based on the indication provided during the second time window. For example, as shown in FIGS. 1A and 1B, receiver 104 may receive formatted data 110 in a second format based on the indication of a configuration of receiver 104 and/or an indication that a first format is incompatible with receiver 104.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 9 shows an exemplary implementation of a computing device 900 in which example embodiments may be implemented. Consistent with all other descriptions provided herein, the description of computing device 900 is a non-limiting example for purposes of illustration. Example embodiments may be implemented in other types of computer systems, as would be known to persons skilled in the relevant art(s). Computing device 900 may comprise, for example, an implementation of any one of transmitter 102 and/or receiver 104, as described in reference to transmitter and receiver operation FIGS. 1-8.

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing any of the components shown in FIG. 1 (e.g., transmitter 102, receiver 104), any of the operations shown in FIGS. 2-6, and any of the steps of the flowcharts depicted in FIGS. 7 and 8.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

Methods, systems and computer program products are provided for transmission configuration indication, error detection and/or recovery (e.g., to be compatible with a receiver configuration) by temporal interpretation of one or more signals. A transmitter may interpret one or more signals a first way during one or more time windows and a second way during one or more other time windows. For example, video resolution may be indicated in a V-by-One® interface by temporally repurposing a hot plug detect (HPD) signal and/or a clock and data recovery (CDR) lock signal. Transmission format may be indicated before or after transmission begins. Transmitter configuration error detection and recovery may be implemented by temporally repurposing one or more signals. For example, a transmitter may transmit data in an assumed or default format. A receiver may indicate the assumed transmission format is incompatible with the receiver configuration. A receiver may indicate a compatible transmission format (e.g., among more than two formats), for example, based on timing or pulsing transitions in a temporally repurposed signal. A transmitter may respond to the repurposed signal indication by transmitting a different (e.g., compatible) format.

In examples, a system may comprise a transmitter configured to interpret a first (e.g., HPD) signal (e.g., associated with one or more pins of the transmitter) received during a first time window as an indication of whether there is a connection between the transmitter (e.g., a V-by-One® transmitter) and a receiver (e.g., a display). The transmitter may be configured to interpret a second (e.g., a CDR lock) signal received during the first time window as an indication of whether there is a clock and data recovery lock by the receiver. The transmitter may be configured to interpret at least one of the first and second signals received during a second time window as an indication of transmission format compatibility with the receiver (e.g., or as an indication of a configuration of the receiver or as an indication for the transmitter to switch to a different transmission format. The transmitter may be configured to transmit information (e.g., video and/or audio data) to the receiver in a selected format based on the indication received during the second time window.

The second time window may be determined based on a time of assertion of the first or second signals. The second time window may occur after the first time window.

The transmitter may be further configured to transmit the information in an assumed format before the second time window (e.g., without determining the configuration of the receiver or a compatible format for the receiver). Transmission of an assumed format (e.g., based on an assumed receiver configuration) may lead to configuration error detection and recovery.

The transmitter may be configured to transmit information in the selected format based on the indication received during the second time window, for example, by changing transmission format of the information from the assumed format to the selected format based on the indication received during the second time window.

The transmitter may be configured to interpret the at least one of the first and second signals received during the second time window as an indication of transmission format compatibility with the receiver, for example, by interpreting deassertion of the first or second signal during the second time window as an indication that the assumed format is incompatible with the receiver.

The transmitter may be configured to interpret the at least one of the first and second signals received during the second time window as an indication of transmission format compatibility with the receiver, for example, by interpreting deassertion of the first or second signal at a first time after assertion of the second signal as an indication of a first compatible format; and by interpreting deassertion of the first or second signal at a second time after assertion of the second signal as an indication of a second compatible format.

The transmitter may be configured to interpret the at least one of the first and second signals received during the second time window as an indication of transmission format compatibility with the receiver, for example, by interpreting a first pulse train of the first or second signal during the second time window as an indication of a first compatible format; and by interpreting a second pulse train of the first or second signal during the second time window as an indication of a second compatible format.

The information may comprise, for example, at least one of video data or audio data. The receiver may comprise, for example, a display. The transmitter may comprise, for example, a V-by-One® transmitter.

In examples, a method (e.g., implemented by a transmitter) may comprise interpreting a first (e.g., an HPD) signal received during a first time window as an indication of whether there is a connection between the transmitter (e.g., V-by-One® transmitter) and a receiver (e.g., display); interpreting a second (e.g., CDR lock) signal received during the first time window as an indication of whether there is a clock and data recovery lock by the receiver; transmitting information to the receiver in a first format (e.g., without determining the configuration of the receiver or a compatible format for the receiver); interpreting at least one of the first and second signals received during a second time window as an indication of whether the first format is incompatible with the receiver; and transmitting to the receiver the information (e.g., video and/or audio data) in a second format based on the indication received during the second time window.

The second time window may be determined based on a time of assertion of the first or second signals. The second time window may be after the first period.

The transmitter may be configured to interpret the at least one of the first and second signals received during a second time window as an indication of whether the first format is incompatible with the receiver, for example, by interpreting deassertion of the first or second signal during the second time window as an indication that the assumed format is incompatible with the receiver.

The transmitter may be configured to interpret the at least one of the first and second signals received during a second time window as an indication of whether the first format is incompatible with the receiver, for example, by interpreting deassertion of the first or second signal at a first time after assertion of the second signal as an indication of a first compatible format; and interpreting deassertion of the first or second signal at a second time after assertion of the second signal as an indication of a second compatible format.

The transmitter may be configured to interpret the at least one of the first and second signals received during a second time window as an indication of whether the first format is incompatible with the receiver, for example, by interpreting a first pulse train of the first or second signal during the second time window as an indication of a first compatible format; and interpreting a second pulse train of the first or second signal during the second time window as an indication of a second compatible format. The information may comprise, for example, at least one of video data or audio data. The receiver may comprise, for example, a display. The transmitter may comprise, for example, a V-by-One® transmitter.

In examples, a method (e.g., implemented by a receiver) may comprise providing a first (e.g., HPD) signal during a first time window as an indication of whether there is a connection between the transmitter (e.g., V-by-One® transmitter) and a receiver (e.g., display); providing a second (e.g., CDR lock) signal during the first time window as an indication of whether there is a clock and data recovery lock by the receiver; providing at least one of the first and second signals during a second time window as an indication of transmission format compatibility with the receiver (e.g., as an indication of a configuration of the receiver, a compatible transmission format, or as an indication for the transmitter to switch to a different transmission format); and receiving information (e.g., video and/or audio data) from the transmitter in a selected format based on the indication provided during the second time window.

A method may (e.g., further) comprise, for example, receiving the information in an assumed format (e.g., without providing the configuration of the receiver or a compatible format for the receiver). Providing the at least one of the first and second signals during the second time window as an indication of transmission format compatibility with the receiver may comprise, for example, providing at least one of the first and second signals during a second time window as an indication that the assumed format is incompatible with the receiver.

The receiver may be configured to provide the at least one of the first and second signals during a second time window as an indication of transmission format compatibility with the receiver, for example, by deasserting the first or second signal during the second time window as an indication that the assumed format is incompatible with the receiver.

The receiver may be configured to provide the at least one of the first and second signals during a second time window as an indication of transmission format compatibility with the receiver, for example, by deasserting the first or second signal at a first time after assertion of the second signal as an indication of a first compatible format; and deasserting the first or second signal at a second time after assertion of the second signal as an indication of a second compatible format.

The receiver may be configured to provide the at least one of the first and second signals during a second time window as an indication of transmission format compatibility with the receiver, for example, by providing a first pulse train of the first or second signal during the second time window as an indication of a first compatible format; and providing a second pulse train of the first or second signal during the second time window as an indication of a second compatible format.

The information may comprise, for example, at least one of video data or audio data. The receiver may include, for example, a display, a speaker, and/or other presentation device. The transmitter may comprise, for example, a V-by-One® transmitter. The second time window may be determined, for example, based on a time of assertion of the first or second signals. The second time window may occur after the first period.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
a transmitter configured to:
  interpret a first signal received during a first time window as an indication of whether there is a connection between the transmitter and a receiver;
  interpret a second signal received during the first time window as an indication of whether there is a clock and data recovery lock by the receiver;
  interpret at least one of the first and second signals received during a second time window as an indication of transmission format compatibility with the receiver; and
  transmit information to the receiver in a selected format based on the indication received during the second time window.

2. The system of claim 1, wherein the transmitter is further configured to:
  determine the second time window based on a time of assertion of the first or second signals.

3. The system of claim 1, wherein the transmitter is further configured to:
  transmit the information in an assumed format before receiving the indication during the second time window.

4. The system of claim 3, wherein the transmitter is configured to transmit the information in the selected format based on the indication received during the second time window by:
  changing from transmitting the information in the assumed format to the selected format based on the indication received during the second time window.

5. The system of claim 3, wherein the transmitter is configured to interpret the at least one of the first and second signals received during the second time window as the indication of transmission format compatibility with the receiver by:
  interpreting deassertion of the first or second signal during the second time window as an indication that the assumed format is incompatible with the receiver.

6. The system of claim 1, wherein the transmitter is configured to interpret the at least one of the first and second signals received during the second time window as the indication of transmission format compatibility with the receiver by:
  interpreting deassertion of the first or second signal at a first time after assertion of the second signal as an indication of a first compatible format; and
  interpreting deassertion of the first or second signal at a second time after assertion of the second signal as an indication of a second compatible format.

7. The system of claim 1, wherein the transmitter is configured to interpret the at least one of the first and second signals received during the second time window as an indication of transmission format compatibility with the receiver by:
  interpreting a first pulse train of the first or second signal during the second time window as an indication of a first compatible format; and
  interpreting a second pulse train of the first or second signal during the second time window as an indication of a second compatible format.

8. The system of claim 1, wherein at least one of the following:
  the information comprises at least one of video data or audio data;
  the receiver comprises a display; or
  the transmitter comprises a V-by-One® transmitter.

9. A method performed by a transmitter comprising:
  interpreting a first signal received during a first time window as an indication of whether there is a connection between a transmitter and a receiver;
  interpreting a second signal received during the first time window as an indication of whether there is a clock and data recovery lock by the receiver;

transmitting information to the receiver in a first format without determining the configuration of the receiver or a compatible format for the receiver;

interpreting at least one of the first and second signals received during a second time window as an indication of whether the first format is incompatible with the receiver; and transmitting the information in a second format to the receiver based on the indication received during the second time window.

10. The method of claim 9, further comprising:
determining the second time window based on a time of assertion of the first or second signals.

11. The method of claim 9, wherein interpreting the at least one of the first and second signals received during the second time window as the indication of whether the first format is incompatible with the receiver comprises:
interpreting deassertion of the first or second signal during the second time window as an indication that the assumed format is incompatible with the receiver.

12. The method of claim 9, wherein interpreting the at least one of the first and second signals received during the second time window as the indication of whether the first format is incompatible with the receiver comprises:
interpreting deassertion of the first or second signal at a first time after assertion of the second signal as an indication of a first compatible format; and
interpreting deassertion of the first or second signal at a second time after assertion of the second signal as an indication of a second compatible format.

13. The method of claim 9, wherein interpreting the at least one of the first and second signals received during the second time window as the indication of whether the first format is incompatible with the receiver comprises:
interpreting a first pulse train of the first or second signal during the second time window as an indication of a first compatible format; and
interpreting a second pulse train of the first or second signal during the second time window as an indication of a second compatible format.

14. The method of claim 9, wherein at least one of the following:
the information comprises at least one of video data or audio data;
the receiver comprises a display; or
the transmitter comprises a V-by-One® transmitter.

15. A method performed by a receiver comprising:
providing a first signal during a first time window as an indication of whether there is a connection between a transmitter and a receiver;
providing a second signal during the first time window as an indication of whether there is a clock and data recovery lock by the receiver;

providing at least one of the first and second signals during a second time window as an indication of transmission format compatibility with the receiver; and receiving information from the transmitter in a selected format based on the indication provided during the second time window.

16. The method of claim 15, further comprising:
receiving the information from the transmitter in an assumed format before providing the indication during the second window; and
wherein providing the at least one of the first and second signals during the second time window as the indication of transmission format compatibility with the receiver comprises:
providing at least one of the first and second signals during the second time window as an indication that the assumed format is incompatible with the receiver.

17. The method of claim 16, wherein providing the at least one of the first and second signals during the second time window as the indication of transmission format compatibility with the receiver comprises:
deasserting the first or second signal during the second time window as an indication that the assumed format is incompatible with the receiver.

18. The method of claim 15, wherein providing the at least one of the first and second signals during the second time window as the indication of transmission format compatibility with the receiver comprises:
deasserting the first or second signal at a first time after assertion of the second signal as an indication of a first compatible format; and
deasserting the first or second signal at a second time after assertion of the second signal as an indication of a second compatible format.

19. The method of claim 15, wherein providing the at least one of the first and second signals during the second time window as the indication of transmission format compatibility with the receiver comprises:
providing a first pulse train of the first or second signal during the second time window as an indication of a first compatible format; and
providing a second pulse train of the first or second signal during the second time window as an indication of a second compatible format.

20. The method of claim 15, wherein at least one of the following:
the information comprises at least one of video data or audio data;
the receiver comprises a display;
the transmitter comprises a V-by-One® transmitter; or
the second time window is determined based on a time of assertion of the first or second signals.

* * * * *